(12) United States Patent
Yamashita

(10) Patent No.: US 7,290,031 B2
(45) Date of Patent: Oct. 30, 2007

(54) INFORMATION PROCESSING SYSTEM, INFORMATION PROCESSING APPARATUS, ORDER INFORMATION FILE USE METHOD, STORAGE MEDIUM WHICH STORES INFORMATION PROCESSING APPARATUS READABLE PROGRAM THAT IMPLEMENTS THE METHOD, AND THE PROGRAM

(75) Inventor: Shinji Yamashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 846 days.

(21) Appl. No.: 10/429,769

(22) Filed: May 6, 2003

(65) Prior Publication Data

US 2003/0210429 A1 Nov. 13, 2003

(30) Foreign Application Priority Data

May 10, 2002 (JP) ............................. 2002-136143

(51) Int. Cl.
*G06F 15/16* (2006.01)
(52) U.S. Cl. ...................................... 709/203; 709/229
(58) Field of Classification Search ................ 709/203, 709/232, 223, 229; 707/1, 9; 345/10, 29, 345/39; 705/39, 51; 713/167; 358/1.14, 358/1.15, 1.18, 487
See application file for complete search history.

(56) References Cited

U.S. PATENT DOCUMENTS

| | | | |
|---|---|---|---|
| 5,220,674 A * | 6/1993 | Morgan et al. ............. | 709/223 |
| 6,154,295 A * | 11/2000 | Fredlund et al. ............ | 358/487 |
| 6,327,049 B1 * | 12/2001 | Ohtsuka ..................... | 358/1.18 |
| 6,577,311 B1 * | 6/2003 | Crosby et al. .............. | 345/428 |
| 6,619,868 B2 * | 9/2003 | Ishida ......................... | 400/76 |
| 6,714,209 B2 * | 3/2004 | Van Valer ................... | 345/629 |
| 6,801,999 B1 * | 10/2004 | Venkatesan et al. ........ | 713/167 |
| 6,934,048 B2 * | 8/2005 | Igarashi et al. ............. | 358/1.15 |
| 6,965,404 B2 * | 11/2005 | Hosoda et al. ........... | 348/231.6 |
| 6,970,259 B1 * | 11/2005 | Lunt et al. .................. | 358/1.14 |
| 6,976,084 B2 * | 12/2005 | Pineau et al. ............... | 709/232 |
| 7,047,241 B1 * | 5/2006 | Erickson ....................... | 707/9 |

(Continued)

FOREIGN PATENT DOCUMENTS

EP 0 878 956 5/1998

(Continued)

OTHER PUBLICATIONS

Super high definition imaging system in ATM network Suzuki, R.; Tanno, O.; Kunimi, A.; Koshiji, M.; Kato, K.; Murakami, T.; Image Processing and its Applications, 1995., Fifth International Conference on Jul. 4-6, 1995 pp. 475-479.*

(Continued)

*Primary Examiner*—Thong Vu
(74) *Attorney, Agent, or Firm*—Fitzpatrick, Cella, Harper & Scinto

(57) ABSTRACT

When receiving an order of processing data received through a network and held, an operation of inputting an order information by a third party other than an owner is simple by reusing the order information by the owner of the data. Since the owner can set whether or not to allow the third party reusing the order information or whether or not to allow the third party editing the order information, it is possible to reflect requests from the owner.

7 Claims, 14 Drawing Sheets

U.S. PATENT DOCUMENTS

| | | | |
|---|---|---|---|
| 2002/0112001 A1* | 8/2002 | Sutherland et al. | 709/203 |
| 2002/0120757 A1* | 8/2002 | Sutherland et al. | 709/229 |
| 2002/0126149 A1* | 9/2002 | Umeda | 345/769 |
| 2002/0180803 A1* | 12/2002 | Kaplan et al. | 345/810 |
| 2003/0097331 A1* | 5/2003 | Cohen | 705/39 |
| 2003/0110182 A1* | 6/2003 | Christophersen et al. | 707/104.1 |
| 2003/0154178 A1* | 8/2003 | McIntyre et al. | 707/1 |
| 2003/0225700 A1* | 12/2003 | Lao et al. | 705/51 |

FOREIGN PATENT DOCUMENTS

| | | |
|---|---|---|
| EP | 0 930 774 | 7/1999 |
| WO | WO 99/19811 | 4/1999 |

OTHER PUBLICATIONS

High-precision color transformation system Asakawa, K.; Sugiura, H.; Consumer Electronics, IEEE Transactions on vol. 41, Issue 2, May 1995 pp. 304-312.*

Running the Web Backwards: Appliance Data Services—Andrew Huang Benjamin (2000) swig.stanford.edu/public/projects/ads/projects/papers/www9.ps.*

* cited by examiner

FIG. 6

| ALBUM PRINT INFORMATION | |
|---|---|
| PRINT IMAGE | IMAGE 9 |
| | IMAGE 2 |
| | IMAGE 6 |
| | IMAGE 1 |
| | IMAGE 7 |
| ALBUM COVER IMAGE | IMAGE 2 |

600 — PRINT IMAGE row group
601 — ALBUM COVER IMAGE

FIG. 7

| ALBUM PRINT INFORMATION | | | | |
|---|---|---|---|---|
| EACH IMAGE PRINT INFORMATION | IMAGE 9 | COMMENT | COMMENT 1 | ⎫ |
| | IMAGE 2 | COMMENT | COMMENT 2 | ⎪ |
| | IMAGE 6 | COMMENT | COMMENT 3 | ⎬ 700 |
| | IMAGE 1 | COMMENT | COMMENT 4 | ⎪ |
| | IMAGE 7 | COMMENT | COMMENT 5 | ⎭ |
| ALBUM COVER IMAGE | IMAGE 2 | | | |
| 701 — COLOR OF COVER | COLOR 3 | | | |
| 702 — FONT | GOTHIC | | | |
| 703 — FINISHING | SILKY | | | |
| 704 — TITLE | TITLE CHARACTER STRING | | | |
| 705 — SUBTITLE | SUBTITLE CHARACTER STRING | | | |
| 706 — IMAGE LAYOUT IN PAGE | ( UPPER JUSTIFY, RIGHT JUSTIFY ) | | | |
| 707 — COMMENT LAYOUT IN PAGE | ( LOWER JUSTIFY, LEFT JUSTIFY ) | | | |
| 708 — THIRD PARTY PERMISSION FLAG | false | | | |

FIG. 12

| ALBUM PRINT INFORMATION | | | |
|---|---|---|---|
| EACH IMAGE PRINT INFORMATION | IMAGE 9 | COMMENT | COMMENT 1, false |
| | IMAGE 2 | COMMENT | COMMENT 2, false |
| | IMAGE 6 | COMMENT | COMMENT 3, false |
| | IMAGE 1 | COMMENT | COMMENT 4, false |
| | IMAGE 7 | COMMENT | COMMENT 5, false |
| ALBUM COVER IMAGE | IMAGE 2, false | | |
| COLOR OF COVER | COLOR 3, true | | |
| FONT | GOTHIC, true | | |
| FINISHING | SILKY, false | | |
| TITLE | TITLE CHARACTER STRING, false | | |
| SUBTITLE | SUBTITLE CHARACTER STRING, true | | |
| IMAGE LAYOUT IN PAGE | ( UPPER JUSTIFY, RIGHT JUSTIFY ), true | | |
| COMMENT LAYOUT IN PAGE | ( LOWER JUSTIFY, LEFT JUSTIFY ), true | | |
| THIRD PARTY PERMISSION FLAG | true | | |

INFORMATION PROCESSING SYSTEM, INFORMATION PROCESSING APPARATUS, ORDER INFORMATION FILE USE METHOD, STORAGE MEDIUM WHICH STORES INFORMATION PROCESSING APPARATUS READABLE PROGRAM THAT IMPLEMENTS THE METHOD, AND THE PROGRAM

FIELD OF THE INVENTION

The present invention relates to an information processing system, an information processing apparatus, an order information use method, a storage medium which stores an information processing apparatus readable program that implements the method, and a program and, more particularly, to an information processing system, an information processing apparatus, an order information use method, a storage medium which stores an information processing apparatus readable program that implements the method, and a program, which archive user's electronic data on a server connected using a communication environment such as the Internet and make the data open to a third party.

BACKGROUND OF THE INVENTION

Recent preparation of communication infrastructures and development of information communication technology make it possible to provide information providing services using the Internet.

A kind of information providing service is created, which is a network service that keeps digital image data obtained by a user using an image input device on the storage area of a server on a network and allow the user to browse the digital image data as needed. There is also a network service which makes user's digital image data open to a third party desired by the user. Providers that provide such network services will be referred to as photo sites hereinafter.

When a user is to print digital image data in such a photo site, it may be possible to set print information such as the layout and order of image data and comments for them.

However, a third party who is to print the digital image data made open by the user cannot use the print information set by the user. That is, in the photo site, the user cannot allow the third party to print his/her image data in accordance with a desired comment or layout.

The problem of a print service on a network has been described above. However, this problem is common to all network services because a third party cannot use various settings, information, and added attributes that are made by a user for a service.

SUMMARY OF THE INVENTION

The present invention has been made to solve the above problem of the prior art, and has as its object to provide an information processing system, an information processing apparatus, an order information use method, a storage medium which stores an information processing apparatus readable program that implements the method, and a program, which make setting information related to a service, which is set by a user, usable for a third party who is to receive the service so as to provide desired setting information of the user to the third party.

Especially in a print service system, print information such as comments and layout of image data set by the user is made usable even when the third party is to print the image data, thereby providing the third party with image data printing in accordance with the user's desired layout.

In order to achieve the above object, according to the present invention, there is provided a method of receiving an order of processing data received through a network and held, comprising the steps of: setting whether or not to allow using an order information file provided based on an operation of an owner of the data; and transmitting to the network a display data for displaying contents of the order information file if it is set to allow using the order information file, wherein a processing of the data is executed in accordance with contents of the order information file.

In said setting step, it is set whether or not to allow editing the order information file. In said setting step, it is set whether or not to allow a third party other than the owner using the order information file. The method further comprises a step of instructing to execute a processing of the data in accordance with contents of the order information file. The processing is a print processing of the data, and the order information file includes at least one of print setting information, a print number of copies and print layout.

According to the present invention, there is also provided a program of making a computer execute a method of receiving an order of processing data received through a network and held, said method comprising the steps of: setting whether or not to allow using an order information file provided based on an operation of an owner of the data; and transmitting to the network a display data for displaying contents of the order information file if it is set to allow using the order information file, wherein a processing of the data is executed in accordance with contents of the order information file.

According to the present invention, there is further provided a computer for executing a method of receiving an order of processing data received through a network and held, said method comprising the steps of: setting whether or not to allow using an order information file provided based on an operation of an owner of the data; and transmitting to the network a display data for displaying contents of the order information file if it is set to allow using the order information file, wherein a processing of the data is executed in accordance with contents of the order information file.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing album print information set by the owner user according to the embodiment of the present invention;

FIG. 7 is a view showing album print information set by the owner user according to the embodiment of the present invention;

FIG. 12 is a view showing album print information set by the owner user according to the embodiment of the present invention;

DETAILED DESCRIPTION OF THE PREFERRED EMBODIMENT

A preferred embodiment of the present invention will be described below in detail with reference to the accompanying drawings. The relative layout of constituent elements, display windows, and the like described in the embodiment do not limit the scope of the present invention unless otherwise specified. A system that provides a print service will be described below as an information providing system. However, as described in the summary of the invention, the present invention is not limited to this, and any invention that solves common problems of services using a network is incorporated in the present invention. In the embodiment, printing will be described. However, the present invention can also be applied to image display setting in browsing.

Arrangement and Basic Operation of Information Providing System of Embodiment

An information providing system which shares and provides digital image data through the Internet will be described as an embodiment of the present invention.

Figure 1:
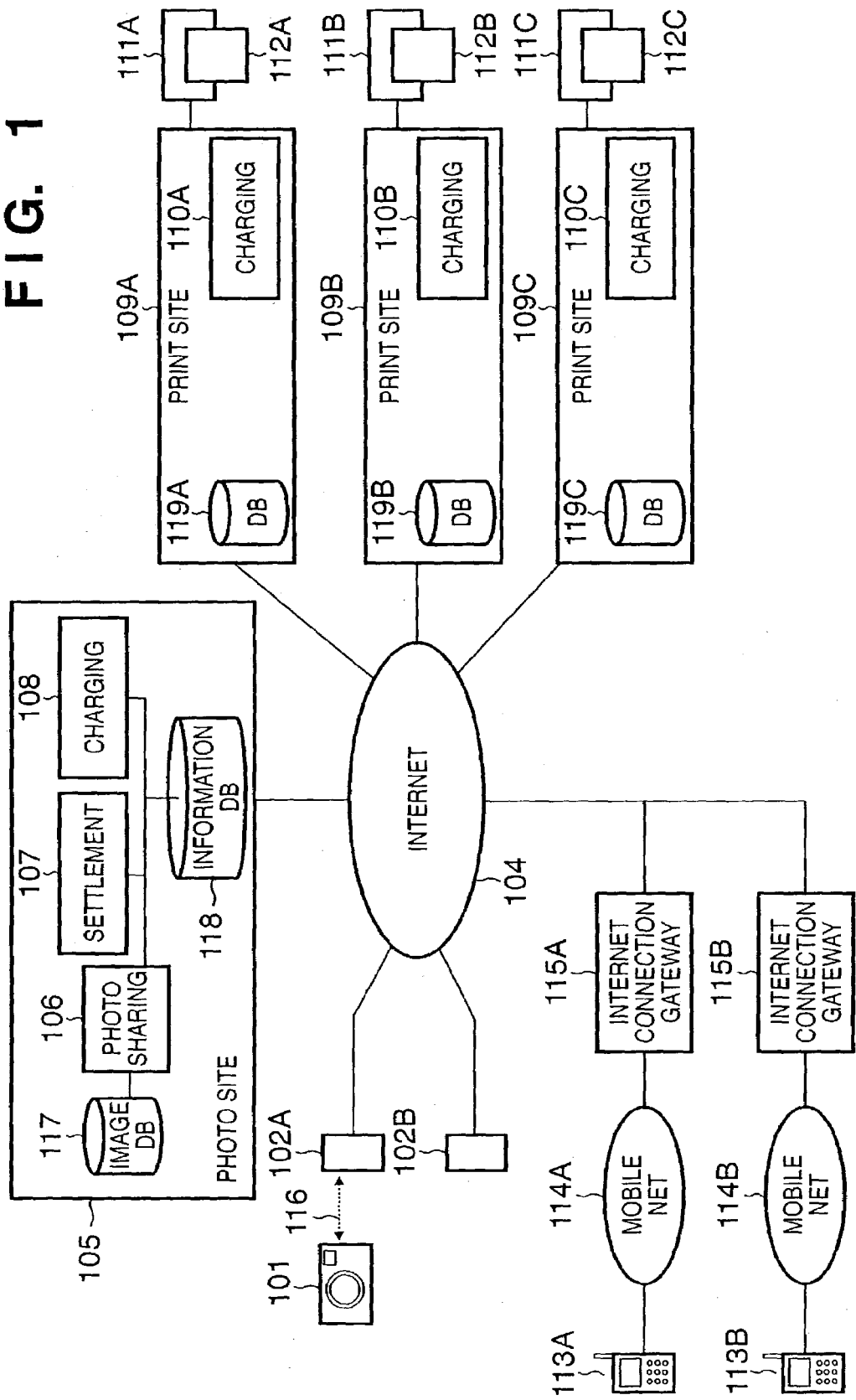
FIG. 1 is a view showing the schematic arrangement of an entire information providing system according to an embodiment of the present invention.

FIG. 1 shows an entire system that constitutes a service in this embodiment. In the following description, a person concerned, who archives image data, will be simply referred to as a user and a third party will be referred to as a browsing user.

Example of Image Data Acquisition

An image input device 101 is a digital still camera capable of photographing a still image and recording it as image data or a digital video camera capable of sensing a moving image and recording it as moving image data. The image input device 101 is a device which converts an optical image as image information into an electrical signal, performs predetermined image processing, and records/plays back the image as digital information. Reference numeral 102A denotes a user personal computer (to be referred to as a user PC hereinafter); and 116, a data transfer interface used to transfer photographed image data between the image input device 101 and the user PC 102A. The data transfer interface 116 is a wired interface represented by USE or IEEE 1394 or a wireless interface represented by IrDA or Bluetooth.

Image data photographed by the image input device 101 and stored as digital information is transferred to a storage area of an information storage device represented by the HDD of the user PC 102A through the data transfer interface 116. To transfer image data from the image input device 101 to the user PC 102A, image data stored in the information storage device in the image input device 101 is transferred at once in accordance with an instruction from an OS or dedicated software installed in the user PC 102A. Alternatively, in accordance with a transfer command sent from the image input device 101, the OS or dedicated software in the e user PC 102A ensures a data recording area in the information recording section of the user PC 102A and transfers image data.

Example of Upload of Image Data

The image data thus transferred to the user PC 102A is uploaded to a photo site 105 connected to Internet 104 in accordance with the following procedure.

A browser which has a standard protocol capable of transferring information in the Internet 104 and operates on the user PC 102A accesses the photo site 105 using the standard protocol such as http protocol and displays information linked with multimedia information such as image and audio data generated by a description language such as HTML or XML and managed by the server PC of the photo site 105. With this operation, the user PC 102A can receive a service provided by the photo site 105 using the Internet 104 as a communication infrastructure.

The image data photographed by the image input device 101 and stored in the information storage area of the user PC 102A is transferred to the photo site 105 in accordance with a request from the user of the user PC 102A (this transfer will be referred to as image upload hereinafter). For image upload, image data to be transferred is selected from the above-described browser and transferred in synchronism with an image upload request action. Alternatively, image data is selected using software dedicated to image upload and directly transferred for the above-described software dedicated to image upload. In either case, transfer is executed on the basis of a protocol such as http or ftp usable on the Internet. A module that executes the series of operations in the photo site 105 is a photo sharing module 106.

The photo sharing module 106 checks whether the uploaded image data is data usable in the photo site 105. If it is determined that the data is usable, the uploaded image is stored in an image database 117, and the attribute information and the like of the image data are stored in a database 118. At this time, the photo sharing module 106 notifies the user PC 102A that the image data has normally been updated.

The database 118 also systematically manages the data of user attribute information registered in the photo site 105 and various kinds of data such as attribute information of print service providers (to be referred to as print sites hereinafter) that request printout of uploaded image data as well as the above-described attribute information of the image data. The user of the user PC 102A can browse any one of the uploaded image data by designating it. For this browsing, a plurality of uploaded image data may be managed as an album.

Example of Printing of Image Data

The flow of placing a print order of uploaded image data will be sequentially described next. The user of the user PC 102A can browse, through the browser, the image data uploaded to the photo site 105 by himself/herself. To select an image to be browsed, each image to be browsed is selected as a single image. Alternatively, as described above, a plurality of images are registered as one album, an album to be browsed is selected from a plurality of albums, and each image managed in the selected album is selected and browsed.

The photo site 105 sends a print request for the image data uploaded by the user to a print site that provides image data printout as a solution. Such print providers are print sites 109A to 109C. FIG. 1 shows three print sites for the illustrative convenience. However, the number of photo sites may be four or more and is not particularly limited.

The user of the user PC 102A selects image data to be printed as merchandise from the browsing window of the uploaded images. Next, the user of the user PC 102A selects a print site to which he/she wants to give a print order from the print sites 109A to 109C that can be provided by the photo site 105. The user selects a print site to which he/she should give an order in consideration of the service, price, and date of delivery provided by each print site. It is assumed that the user has selected the print site 109A for the descriptive convenience. The basic flow of information is the same even when the user has selected the print site 109B or 109C.

The user who wants to place a print order selects image data for the print order from the browsing window and notifies the photo site 105 of the image data. The photo site 105 generates a provisional print order for the printout-requested image data and sends an estimate request to the print site 109A through the Internet 104. Upon receiving the provisional print order from the photo site 105, the print site 109A causes a charging module 110A serving as a charging means to calculate the price on the basis of the contents of the provisional print order and notifies the photo site 105 of the estimated price through the Internet 104. The photo site 105 receives the information of the estimated price in real time and transfers it to the user PC 102A as information so that the photo site can dynamically present the price presented by the print site 109A to the user.

When the user of the user PC 102A that will place a print order approves purchase at the presented price and returns an approval action to the photo site 105, a settlement module 107 accepts it and executes settlement processing. When settlement is ended, the photo site 105 sends a formal print order to the print site 109A. Upon accepting the formal print order, the print site 109A acquires image data necessary for printout from the database of the photo site 105. Thus acquired image data is output as printed matter 112A by a print means 111A of the print site 109A. The printed matter 112A is sent to a delivery destination designated by the user of the user PC 102A that has requested printout by a certain forwarding means.

The system in which the user who has uploaded image data photographed by the image input device 101 browses the photo site 105 and gives a print order through the user PC 102A has been schematically described above. In this example, a PC is used as a terminal used to upload an image. However, the information providing system according to the present invention is not limited to this. An image may be uploaded from a portable terminal or directly from an image input device such as a digital camera, digital video, scanner, or copying machine.

Example of Browsing Processing of Third Party

A method of allowing a person except the user who has uploaded image data to the photo site 105 to browse, through the Internet 104 using a PC 102B, image data uploaded to the photo site 105 and stored in the database 117 will be described. The photo site 105 provides to a third party designated by the user who has uploaded image data a browsing and print order service of an "uploaded image" or an "album that manages a plurality of uploaded images as one archive".

The user who has uploaded image data to the photo site 105 notifies, using a web browser, the photo site 105 of the attribute information such as a name and the e-mail address of a user (to be referred to as a browsing user hereinafter) to which he/she grants permission to browse image data. To make the image open to the browsing user, the photo site 105 generates a URL (Universal Resource Locator) necessary for making the image open. As the URL to be generated, a unique address using a random number or the like, which cannot be uniquely predicted is assigned. An example will be described below.

http://○○○.com/PhotoSite/Album/
AlbumEntry.cgi?AlbumID=A.INWDMF

The URL that cannot be uniquely expected will be referred to as a random URL

The photo site 105 adds password information necessary for browsing to the generated random URL, as needed, and notifies the browsing user of the random URL by e-mail through the Internet 104. The browsing user who has received the e-mail can brows the image or album designed by the user who has uploaded the image by accessing the Internet 104 from the user PC 102B and inputting the random URL notified by a web browser 120B by e-mail.

Example of Print Order by Third Party

A method of causing the browsing user who uses the user PC 102B to place a print order of image data that can be browsed. The photo site 105 gives an image data print order from the browsing user to one of the print sites 109A to 109C that provide image data printout.

The browsing user of the user PC 102B selects, from the browsing window, image data to be printed and obtained as merchandise. Next, the browsing user who uses the user PC 102B selects the print site 109 to which an order is to be given from the print sites 109A to 109C provided by the photo site 105. The browsing user selects the print site 109 to which he/she should give an order in consideration of the service, unit price, and date of delivery provided by each print site. It is assumed that the user has selected the print site 109B for the descriptive convenience. The basic flow of information is the same even when the user has selected the print site 109A or 109C, and a description thereof will be omitted.

When the browsing user selects image data for which a print order is to be placed and notifies the photo site 105 of it, the photo site 105 generates a provisional print order for the printout-requested image data and transmits an estimate request to the print site 109B through the Internet 104. Upon receiving the provisional print order from the photo site 105, the print site 109B acquires image data necessary for the selected image information from the image database 117 of the photo site 105 and generates selected image information. The selected image information is transmitted to the user PC 102B through the Internet 104 so that the browsing user can input, in the user PC 102B, the print format and the number of prints for each of the images selected on the web browser 120B.

The print site 109B causes a fee calculation (charging) module 110B to calculate an estimate amount on the basis of the information such as the print format and the number of prints for each selected image, and transmits the calculated estimate amount to the photo site 105 through the Internet 104. The photo site 105 receives the information of the estimate amount transmitted from the print site 109B in real time. If the photo site 105 has no user personal information of the browsing user, the photo site 105 transfers the estimate amount transmitted from the print site 109B to the user PC 102B as web information. If the photo site 105 has the user personal information of the browsing user, the photo site 105 transfers a presented amount obtained by adding a point to the estimate amount as web information. In this way, the estimate information can be dynamically presented to the browsing user who will give a print order.

When the browsing user of the user PC 102B that will place a print order approves purchase at the presented price and returns an approval action to the photo site 105, the settlement module 107 serving as a settlement means accepts it and executes settlement processing. When settlement is ended, the photo site 105 sends a formal print order to the print site 109B. Upon accepting the formal print order, the print site 109B acquires image data necessary for printout from the image database 117 of the photo site 105. Thus acquired image data is output as printed matter 112B by a printer 111B serving as a print means of the print site 109B. The printed matter 112B is sent to the browsing user of the user PC 102B that has requested the printout by a certain forwarding means.

Example of Browsing from Portable Terminal

The photo site 105 can provide, to a portable terminal owner designated by the user who has uploaded images, services of browsing notification, browsing function, and print order of the images (or album). Notification e-mail containing URL used to browse an album may be received by a portable terminal. Similarly, an image or album may be browsed from the portable terminal, or a print order may be placed from the portable terminal (the user who uses the photo site 105 from a portable terminal will be referred to as a portable browsing user hereinafter).

The user who has uploaded image data from the user PC 102A to the photo site 105 through the Internet 104 notifies, using a web browser 120A, the photo site 105 of the e-mail address and the attribute information such as a name of a portable browsing user to which he/she grants permission to browse image data. To make images and albums open to the portable browsing user, the photo site 105 generates a random URL necessary for making them open. The photo site 105 adds password information necessary for browsing to the random URL, as needed, and notifies a portable terminal 113A of the portable browsing user of the random URL by e-mail. As for the transfer path of e-mail sent to the portable browsing user, the e-mail is sent, by the Internet 104 through an Internet connection gateway 115A, from the mail delivery server of the photo site 105 to a mobile network 114A capable of transmitting/receiving various kinds of data to/from the portable terminal 113A, and then transferred to the portable terminal 113A.

Upon receiving the e-mail, the portable browsing user inputs the random URL address contained in the e-mail to the dedicated browser of the portable terminal 113A to access the photo site 105 through a path, mobile network 114A→Internet connection gateway 115A→Internet 104. The photo site 105 has browser information dedicated to portable terminals, which is created by a description language such as WML or CompactHTML dedicated to portable terminals as well as the web information created by a description language such as HTML or XML that can be displayed on the Internet 104. The photo site 105 also has image data that are resized and have a size displayable on the portable terminal 113A. In response to a request from the portable terminal 113A, the photo site 105 discriminates the model of the portable terminal 113A and sends information that can be displayed on the portable terminal 113A.

The portable terminal environment where browsing can be performed is not limited to the portable terminal 113A. The photo site 105 prepares browser information of various kinds of formats such that even a portable terminal 113B having different communication protocol specifications, information description language, or mobile network environment can enjoy the services. FIG. 1 shows two portable terminals 113A and 113B as usable portable terminals for the illustrative convenience. However, the number of portable terminals may be three or more.

A browsing request from the portable terminal 113B is sent from a mobile network 114B usable by the portable terminal 113B to an Internet connection gateway 115B, subjected to protocol conversion, and then sent to the photo site 105 connected to the Internet 104. The photo site 105 has image data that are resized and have a size that allows browsing on the portable terminal 113B and browser information created by a description language such as WML or CompactHTML dedicated to portable terminals as well as the web display information created by a description language such as HTML or XML that can be browsed on the Internet 104. In response to a request from the portable terminal 113B, the photo site 105 discriminates the model of the portable terminal 113B and sends information that can be browsed on the portable terminal 113B.

Example of Print Order from Portable Terminal

A method of causing the portable browsing user as the user of the portable terminal 113A or 113B to select image data and place a print order will be described next. The information transmission path between the photo site 105 and portable terminal 113 to be described later is photo site 105→Internet 104→Internet connection gateway 115→mobile network 114→portable terminal 113.

When the portable browsing user inputs the random URL sent by e-mail to the browser of the portable terminal, he/she can browse images or albums designated by the user who has uploaded the images. The portable browsing user selects a print site 109 to which an order is to be given from the print sites 109A to 109C that can be provided by the photo site 105. The portable browsing user selects the print site 109 to which he/she should give an order in consideration of the service, unit price, and date of delivery provided by each print site 109.

It is assumed that the user has selected the print site 109C for the descriptive convenience. The basic flow of information is the same even when the user has selected the print site 109A or 109B, and a description thereof will be omitted.

When the portable browsing user selects image data for which a print order is to be placed and notifies the photo site 105 of it, the photo site 105 generates a provisional print order for the printout-requested image data and transmits an estimate request to the print site 109C through the Internet 104. Upon receiving the provisional print order from the photo site 105, the print site 109C acquires image data necessary for the selected image information from the image database 117 of the photo site 105 and generates selected image information. The selected image information is transmitted to the portable terminal 113A through the Internet 104 so that the portable browsing user can input, in the portable terminal 113A, the print format and the number of prints for each of the selected images.

The print site 109C causes a fee calculation (charging) module 110C to calculate an estimate amount on the basis of the information such as the print format and the number of prints for each selected image, and transmits the calculated estimate amount to the photo site 105 through the Internet 104. The photo site 105 receives the information of the estimate amount transmitted from the print site 109C in real time. If the photo site 105 has no user's personal information of the portable browsing user, the photo site 105 transfers the estimate amount transmitted from the print site 109C to the portable terminal 113A as web information. If the photo site 105 has the user's personal information of the portable browsing user, the photo site 105 transfers a presented amount obtained by adding a point to the estimate amount as web information. In this way, the estimate information can be dynamically presented to the portable browsing user who will give a print order.

When the portable browsing user of the portable terminal 113A that will place a print order approves purchase at the presented price and returns an approval action to the photo site 105, the settlement module 107 serving as a settlement means accepts it and executes settlement processing. When settlement is ended, the photo site 105 sends a formal print order to the print site 109C. Upon accepting the formal print order, the print site 109C acquires image data necessary for printout from the image database 117 of the photo site 105. Thus acquired image data is output as printed matter 112C by a printer 111C serving as a print means of the print site 109C. The printed matter 112C is sent to the portable browsing user as the user of the portable terminal 113A that has requested the printout by a certain forwarding means.

The outline of the information providing system which causes a user as a third party who has an image or album browsing permission from a user who has uploaded the images to browse the image data and place a print order on the basis of information received from the photo site 105 has been described above.

Operation Procedure of Information Providing System of Embodiment

The service contents of the information providing system according to this embodiment, in which when a user (to be also referred to as an owner user hereinafter) as the owner of an album sets album print information, makes it open, and notifies a third party of it, the user (to be also referred to as a browsing user hereinafter) as the third party who receives the notification places an album print order using the album print information set by the owner user, will be described below in detail. The service and function implemented by the system of this embodiment are not limited to those described above.

Example of Print Order Operation by Owner User

Figure 2:
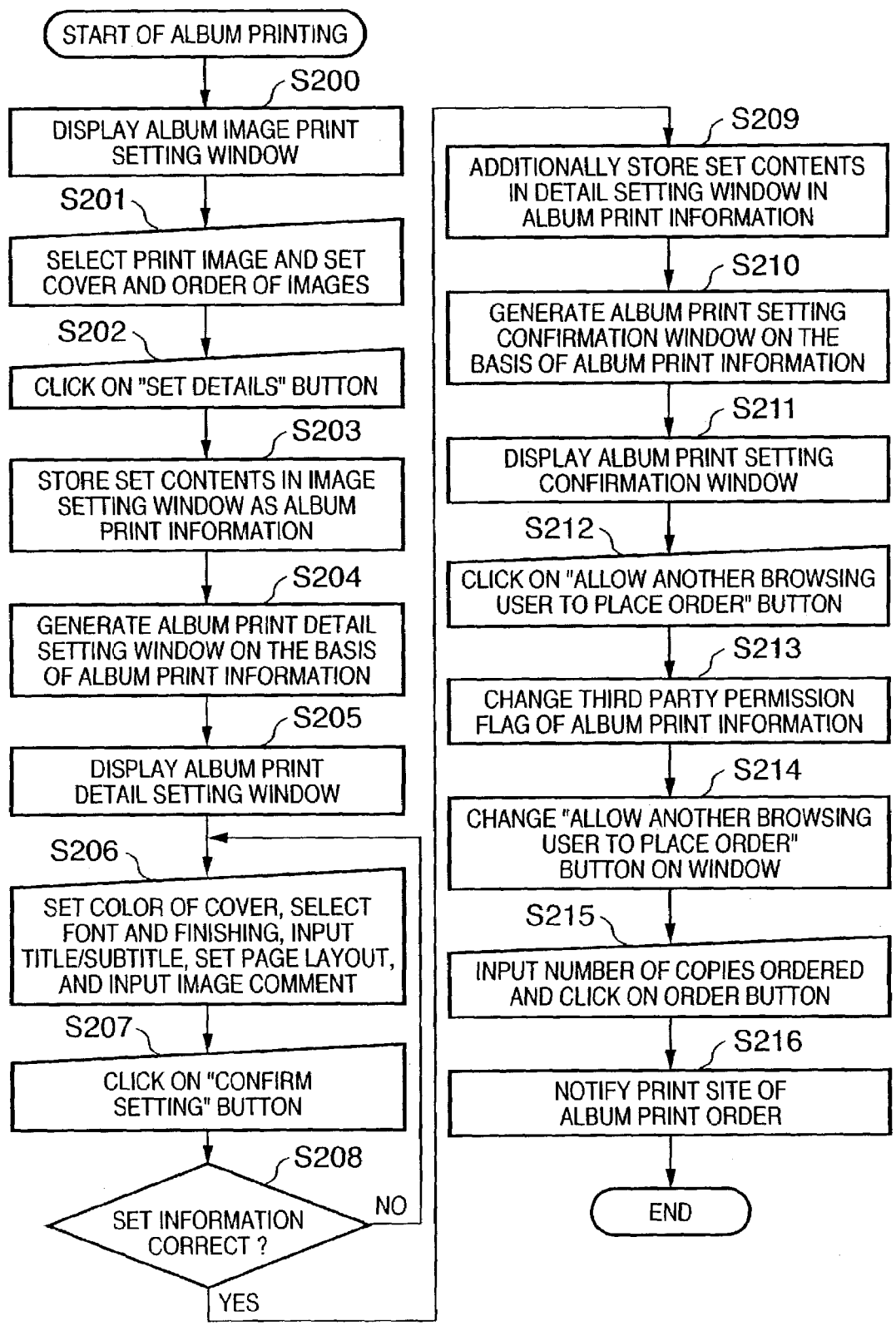
FIG. 2 is a flow chart when an owner user executes album printing according to the embodiment of the present invention.
Figure 3:
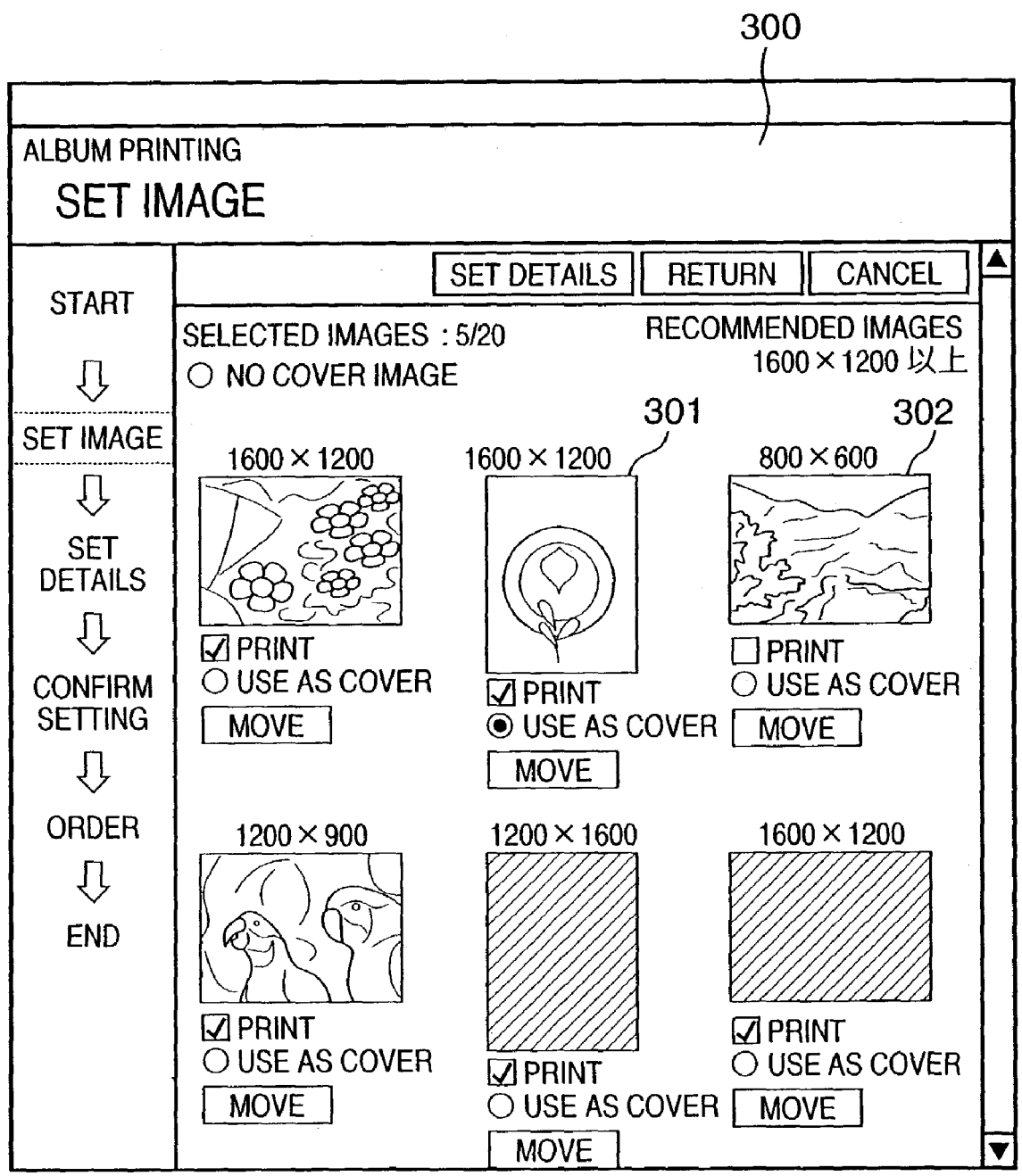
FIG. 3 is a view showing a window in which the owner user executes setting related to images of album print information according to the embodiment of the present invention.
Figure 4:
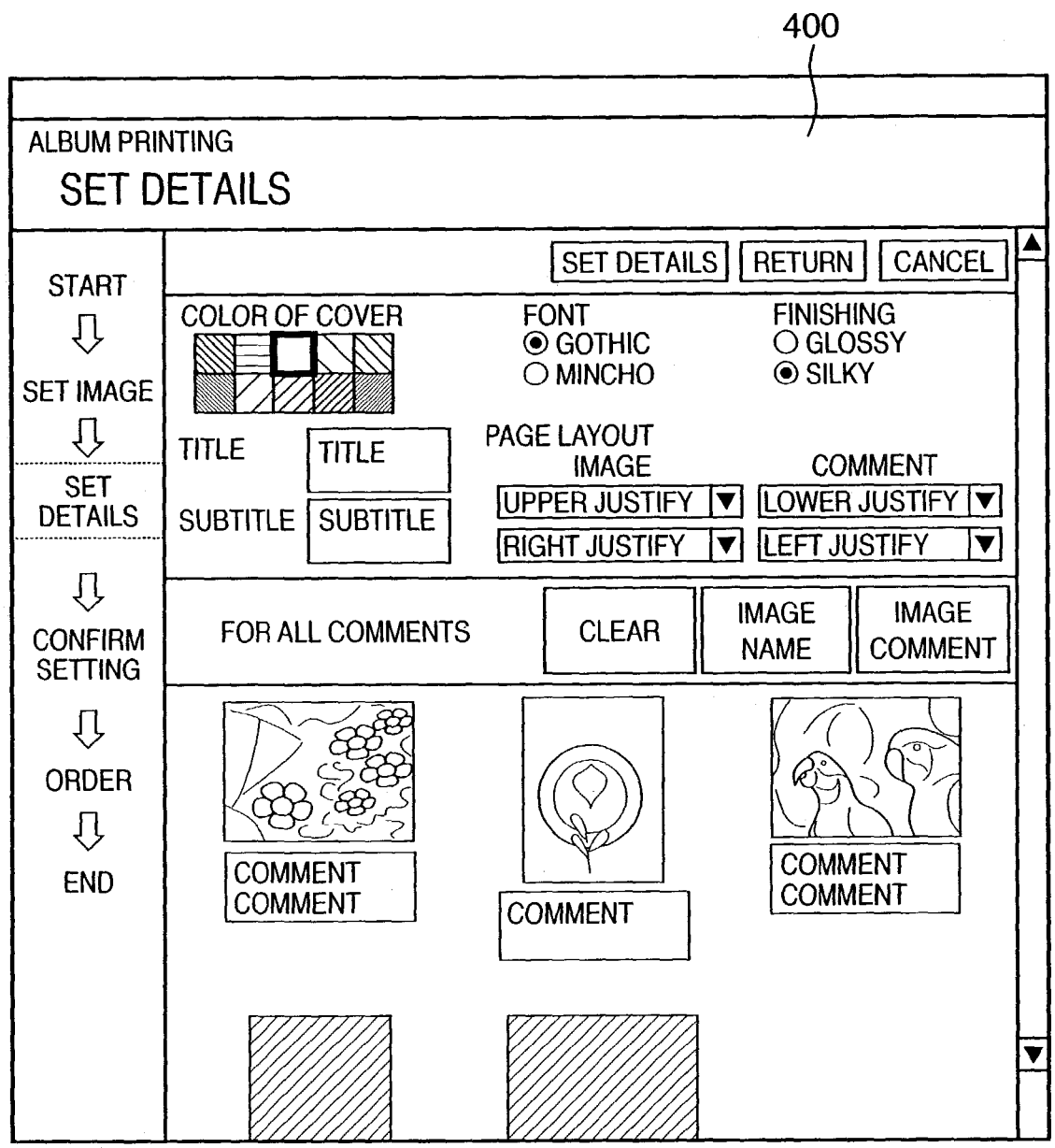
FIG. 4 is a view showing a window in which the owner user executes detailed setting of album print information according to the embodiment of the present invention.
Figure 5:
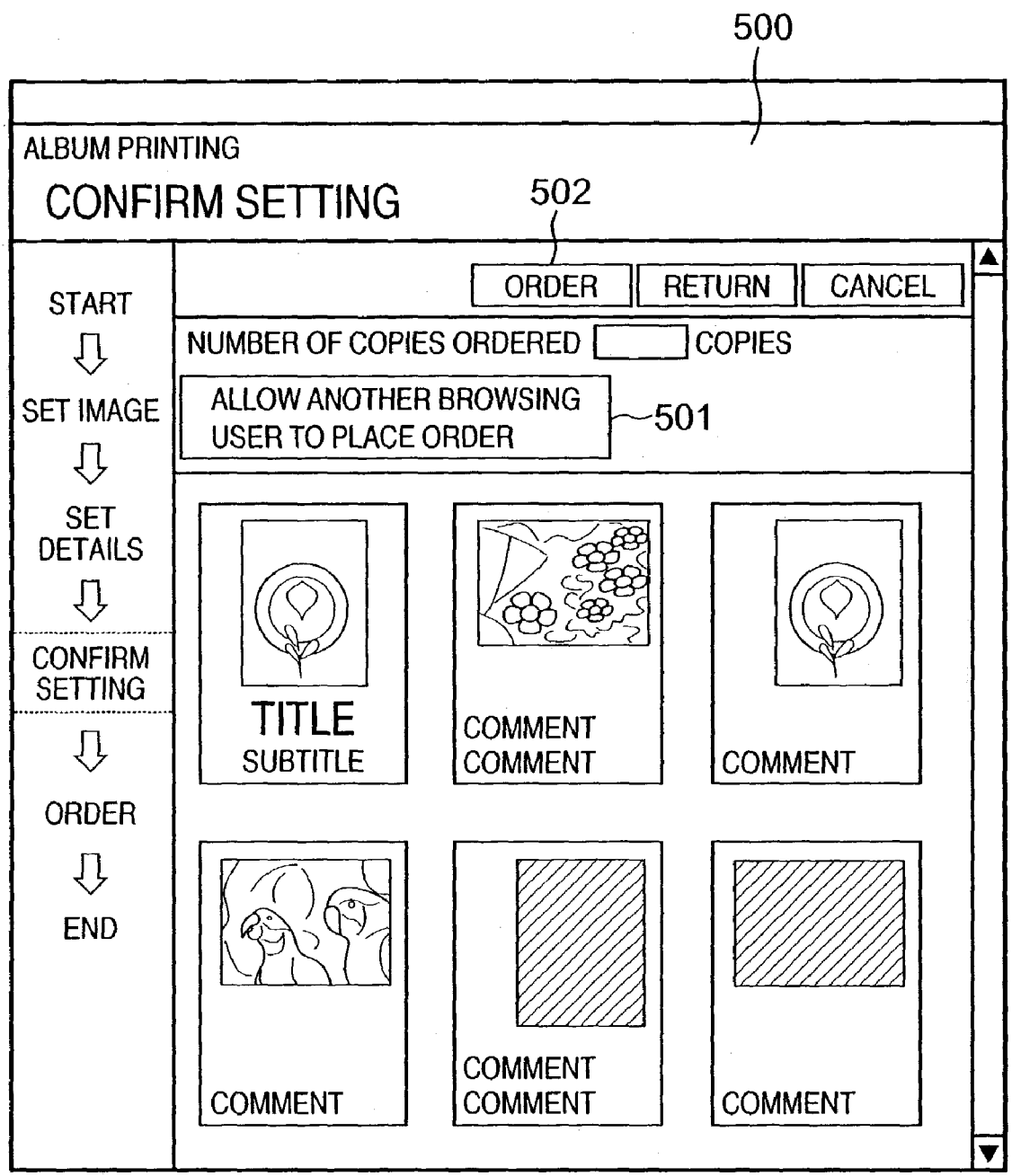
FIG. 5 is a view showing a window in which the owner user confirms settings of album print information according to the embodiment of the present invention.

FIG. 2 is a flow chart showing processing executed by the photo site 105 in this embodiment when the owner user executes album print order operation in accordance with the windows shown in FIGS. 3, 4, and 5.

In step S200, an album print image setting window 300 shown in FIG. 3 is displayed on the user PC 102A of the owner user. In the window 300 shown in FIG. 3, setting for images of album print information is performed. In this embodiment, images to be printed are selected by check-boxes, the cover image of the album to be printed is selected by a radio button, and the order to print image data is set by a "move" button. However, the present invention is not limited to this.

In step S201, the owner user selects images to be printed as an album and sets the order of print images and an image to be used as the cover of the album in the album print image setting window 300. In the example shown in FIG. 3, images other than an image 302 are set for album printing. An image 301 is set as the cover of the album. In step S202, the owner user clicks on the "set details" button on the album print image setting window 300 to execute detail setting as the next stage of album printing.

In step S203, the photo site 105 stores, in the information DB 118, the information set in step S201 by the owner user as album print information. FIG. 6 shows an example of the album print information file stored in step S203. The identifiers of the images selected for album printing are stored in a "print image" item 600 in the order of display. The identifier of the image set to the cover is stored in an "album cover image" item 601.

In step S204, the photo site 105 generates an album print detail setting window on the basis of the album print information stored in step S203. In step S205, an album print detail setting window 400 shown in FIG. 4, which is generated in step S204, is displayed on the user PC 102A. In the window 400 shown in FIG. 4, details of the album print information are set. In this embodiment, the color of the cover of the album, the font of comments, the finishing type of images, the title and subtitle on the cover, the page layout, and comments for the respective images can be set.

In step S206, the owner user sets the color of the cover of the album, the font, the finishing type of print images, the title/subtitle of the album, the page layout, and comments for the respective images in the album print detail setting window 400. In step S207, the owner user clicks on the "confirm setting" button on the album print detail setting window 400 to execute setting confirmation as the next stage of album printing.

In step S208, if the contents set by the owner user are correct, the flow advances to step S209. Otherwise, the flow returns to step S206. For example, if an image and a comment are set to the same position in the page layout, settings are determined to be incorrect. In step S209, the information set by the owner user in step S206 is added to the album print information stored in step S203. FIG. 7 shows an example of the album print information additionally stored in step S209. Comments for the respective images are stored in "comment" items 700 for the images. Other set items 701 to 707 are also stored. In addition, a "third party permission flag" item 708 is added, in which "false" that means that album printing is not permitted to a third party is stored as an initial value.

In step S210, an album print setting confirmation window is generated on the basis of the album print information stored in step S209. In step S211, an album print setting confirmation window 500 shown in FIG. 5, which is generated in step S210, is displayed on the user PC 102A. In the window 500 shown in FIG. 5, the contents set as the album print information are confirmed. The preview thumbnails of the cover and the respective pages are displayed. When the "allow another browsing user to place order" button is clicked on, the print information set by the owner user is stored and becomes usable by a print order as a third party. When the "order" button is clicked on, an album print order is placed.

In the album print setting confirmation window 500, the preview thumbnails of the album cover and the respective pages are displayed on the basis of the album print information. In step S212, the owner user clicks on a "allow another browsing user to place order" button 501 on the album print setting confirmation window 500. In step S213, the photo site 105 changes the album print information additionally stored in step S209 to setting that gives a print permission to a third party. In the example of the album print information shown in FIG. 7, the value of the "third party permission flag" item 708 is changed from "false" to "true" that means use permission to a third party.

In step S214, the photo site 105 changes the "allow another browsing user to place order" button on the album print setting confirmation window 500 to an "inhibit another browsing user from placing order" button. After step S214, if the owner user clicks on the "inhibit another browsing user from placing order" button on the album print setting confirmation window 500, the value of the "third party permission flag" of the album print information is changed to "false". In addition, the "inhibit another browsing user from placing order" button on the window is changed to the "allow another browsing user to place order" button.

In step S215, the owner user inputs the number of copies of album to be printed in the album print setting confirmation window 500 and clicks on an "order" button 502. In step S216, the photo site 105 notifies a print site 119 of the print order to print the album in accordance with the set album print information.

Example of Print Order Operation by Browsing User

Processing of causing the owner user to set album print information for album print operation has been described above. Processing of causing the browsing user as a third party to reuse the set album print information in printing an album will be described next.

Figure 9:
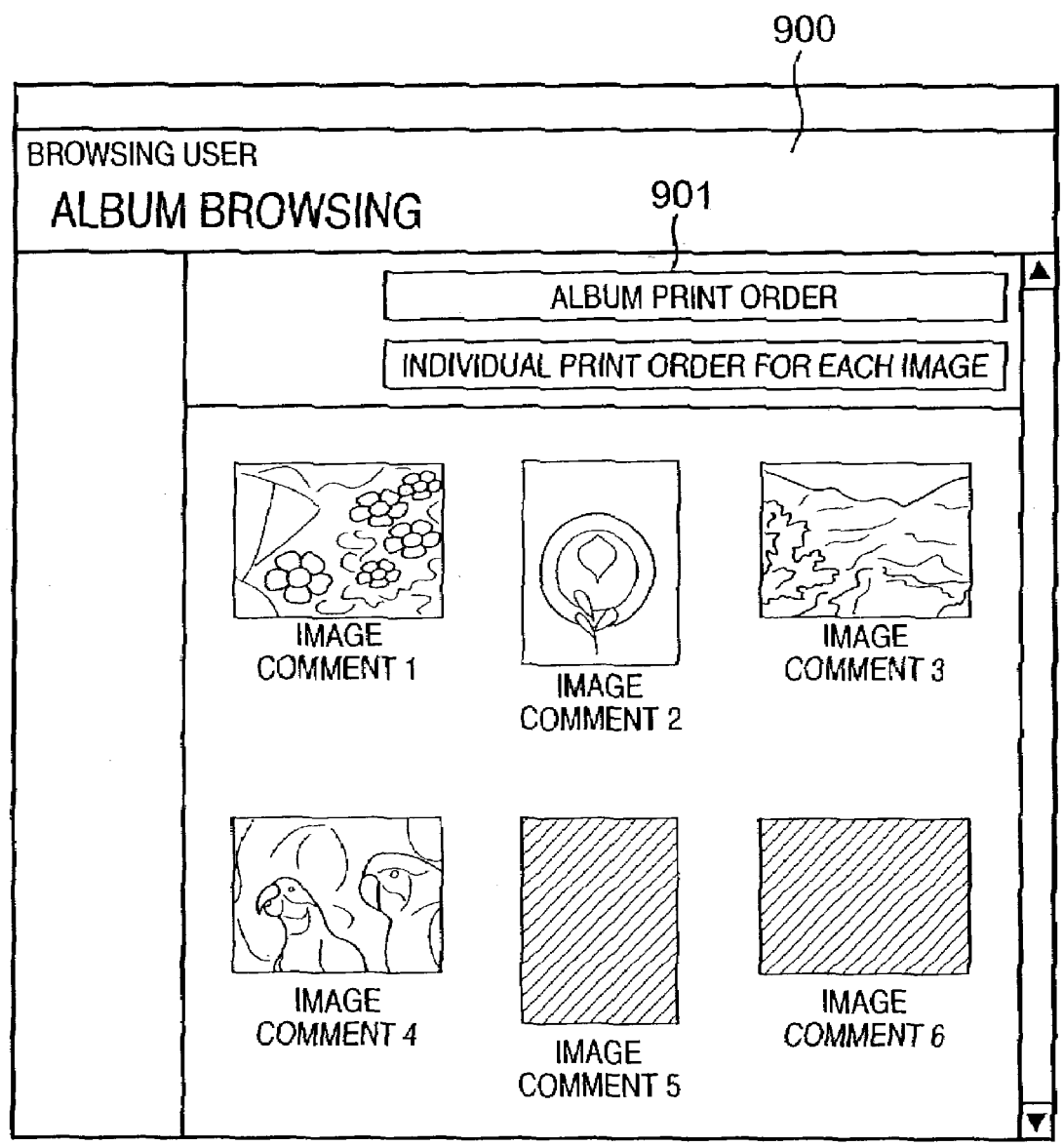
FIG. 9 is a view showing a window in which a browsing user browses an album according to the embodiment of the present invention.
Figure 10:
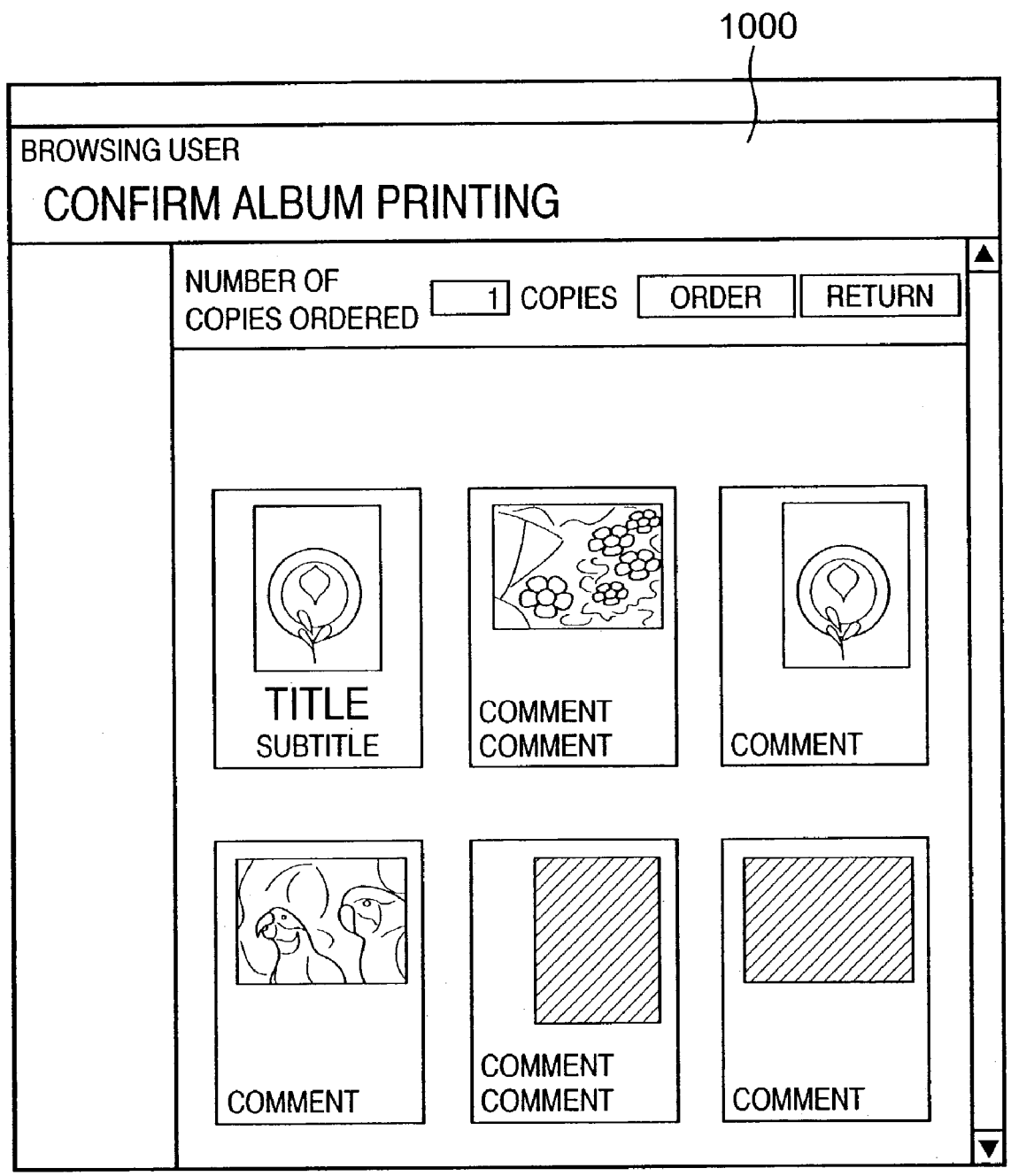
FIG. 10 is a view showing a window in which the browsing user confirms album printing according to the embodiment of the present invention.

FIGS. 9 and 10 show examples of windows in which the browsing user as a third party places a print order. A window 900 shown in FIG. 9 is an example of a window in which the browsing user browses a public album. When a print permission to a third party is set in the album print information, an "album print order" button 901 is displayed. If no print permission is set, this button is not displayed. A window 1000 shown in FIG. 10 is an example of a window displayed when the browsing user selects the "album print order" button. It indicates that an album print order can be placed in accordance with the same settings as that on the album print setting confirmation window 500 of the album owner user shown in FIG. 5.

Figure 8:
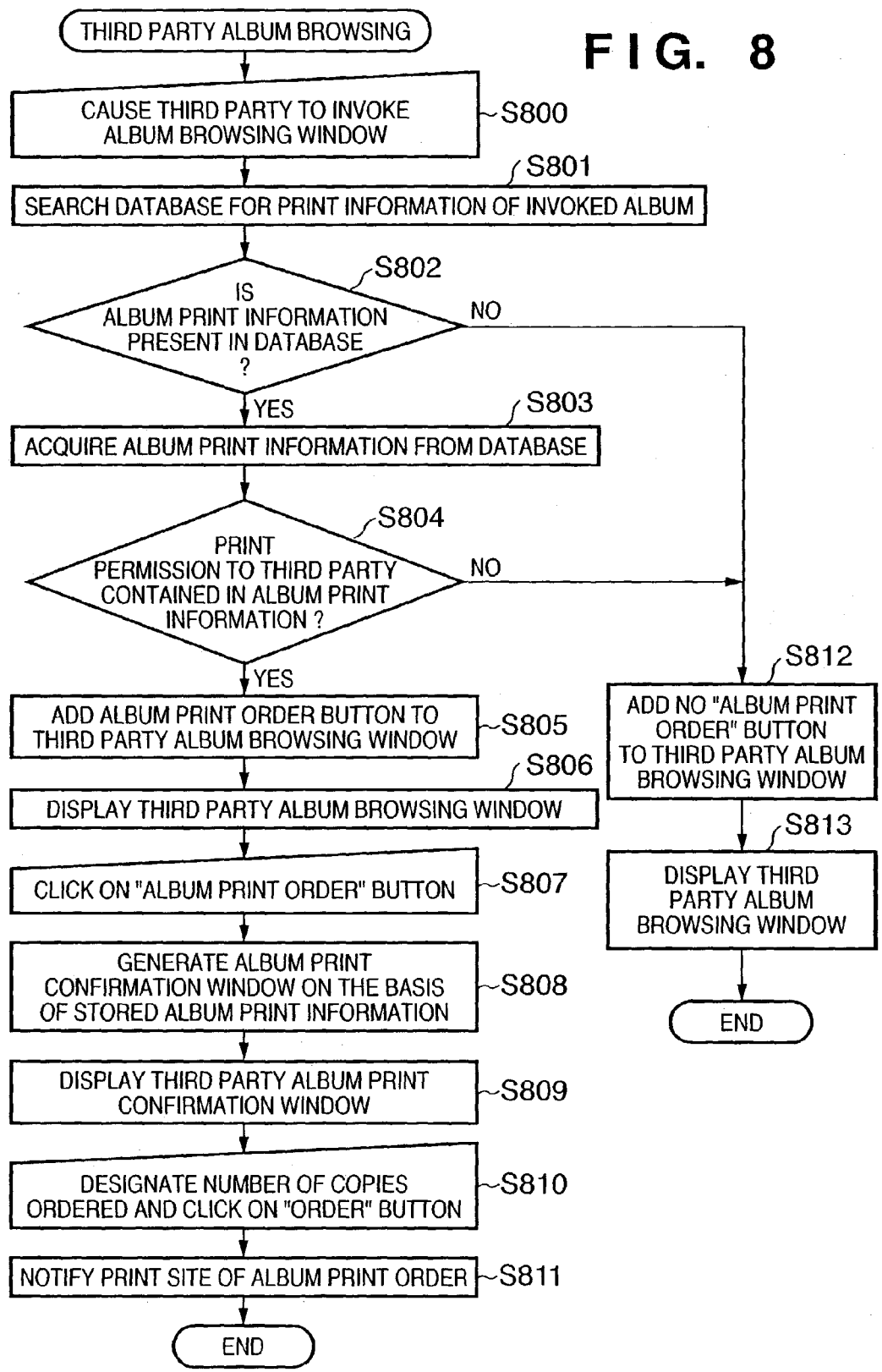
FIG. 8 is a flow chart when a third party executes album printing according to the embodiment of the present invention.

FIG. 8 is a flow chart showing processing executed by the photo site 105 when the browsing user as a third party places an album print order.

In step S800, the third party notifies, through the Internet 104, the photo site 105 that he/she invokes the album browsing window of the album to be browsed using the user PC 102B. In step S801, the photo site 105 searches the information DB 118 for the print information of the album invoked in step S800. In step S802, when the search result in step S801 indicates that the album information is present, the flow advances to step S803. Otherwise, the flow advances to step S812. In step S803, the album print information is acquired from the information DB 118.

In step S804, when the album print information acquired in step S803 contains a print permission to a third party, the flow advances to step S805. Otherwise, the flow advances to step S812. In step S805, the photo site 105 generates an album browsing window with the "album print order" button added. In step S806, the album browsing window for the browsing user, which is generated in step S805, is transmitted and displayed on the user PC 102B. The browsing user album browsing window 900 shown in FIG. 9 is an example of the window displayed in step S806. The "album print order" button 901 is displayed.

In step S807, the browsing user clicks on the "album print order" button 901. In step S808, the photo site 105 generates the album print confirmation window for the browsing user on the basis of the album print information acquired in step S803. In step S809, the album print confirmation window for the browsing user, which is generated in step S808, is transmitted and displayed on the user PC 102B. The browsing user album print confirmation window 1000 shown in FIG. 10 is an example of the window displayed in step S809. The print preview thumbnails of the album cover and the respective pages are displayed. The album can be printed on the basis of the same settings as that on the album print setting confirmation window 500 of the album owner user shown in FIG. 5.

In step S810, the browsing user inputs the number of copies of album to be printed in the album print confirmation window 1000 and clicks on the "order" button. In step S811, the photo site 105 notifies the print site 119 of the print order to print the album in accordance with the set album print information.

In step S812, the photo site 105 generates an album browsing window without adding the "album print order" button. In step S813, the album browsing window for the browsing user, which has been created in step S812, is transmitted and displayed on the user PC 102B. Since the album browsing window displayed in step S813 has no "album print order" button 901, the browsing user cannot print the album set by the owner user.

In this embodiment, album print information can be entirely reused. However, information that can be reused and information to be set by the third party may be distinguished in advance or distinguishably set by the owner user.

Modification of Information Providing System of Embodiment

In the above embodiment, the browsing user executes printing by directly using the album print information set by the owner user. In this embodiment, an example in which a browsing user can edit album print information set by an owner user.

Figure 11:
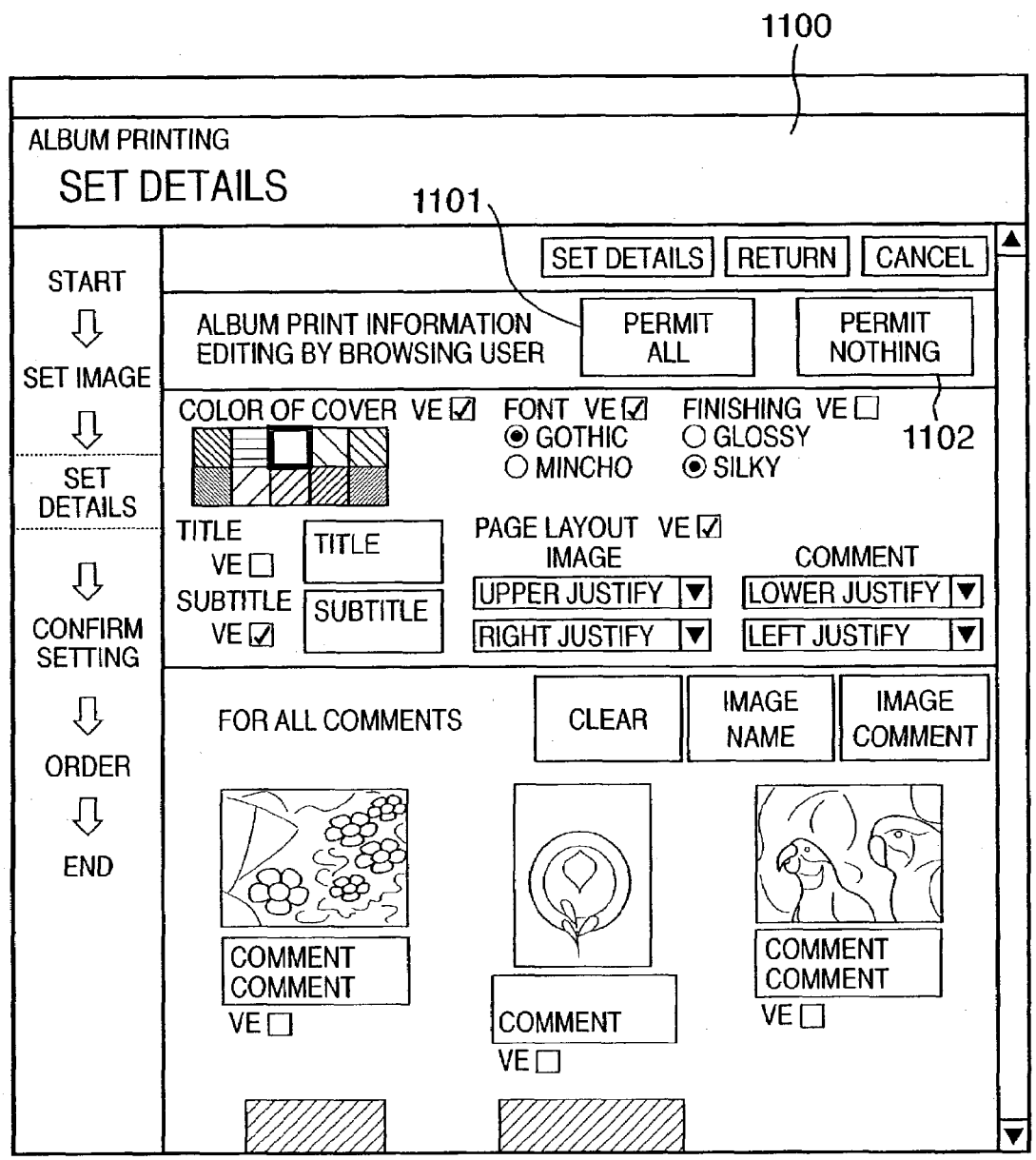
FIG. 11 is a view showing a window in which the owner user executes detailed setting of album print information according to the embodiment of the present invention.

An album print detail setting window 1100 shown in FIG. 11 is an example of a window having an additional function of causing the owner user to set whether he/she permits/inhibits a browsing user to edit album print information. This window is displayed in step S205 of FIG. 2 described above. In the window 1100, whether editing is to be permitted can be set for each item by a checkbox ("VE" in FIG. 11). The example shown in FIG. 11 allows the browsing user to edit the cover color, font, subtitle, and page layout. In the window 1100, when a "permit all" button 1101 is clicked on, the browsing user is allowed to edit all items. When a "permit nothing" 1102 is clicked on, editing of all items can be inhibited. These settings are added to the processing in step S206 of FIG. 2 described above.

FIG. 12 is a view showing an example of the album print information file stored in step S209 in accordance with the owner user's setting in the window 1100. Each print information item has a flag ("true"/"false") representing whether the browsing user can edit the item as well as a value.

Figure 13:
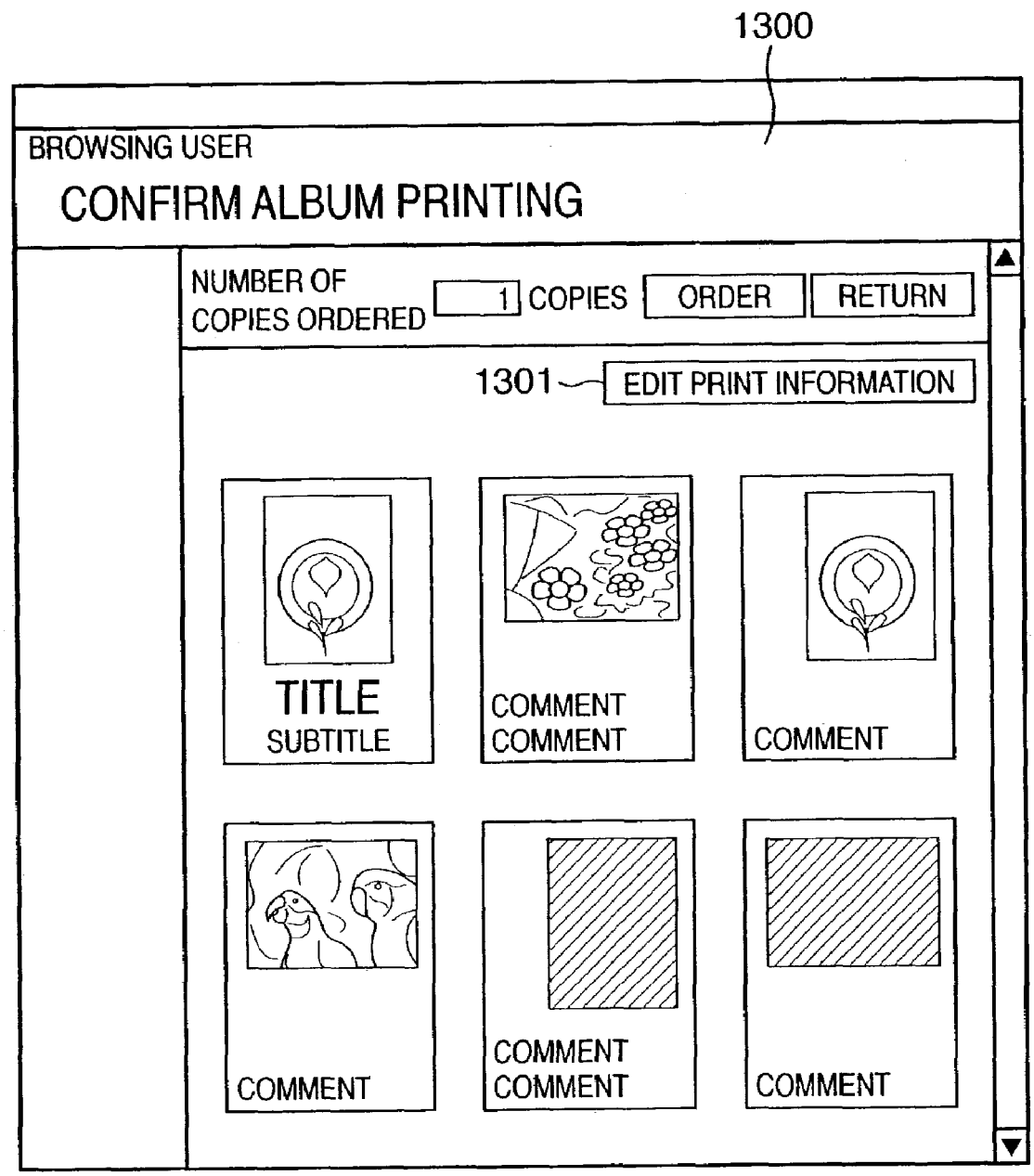
FIG. 13 is a view showing a window in which the browsing user confirms album printing according to the embodiment of the present invention.
Figure 14:
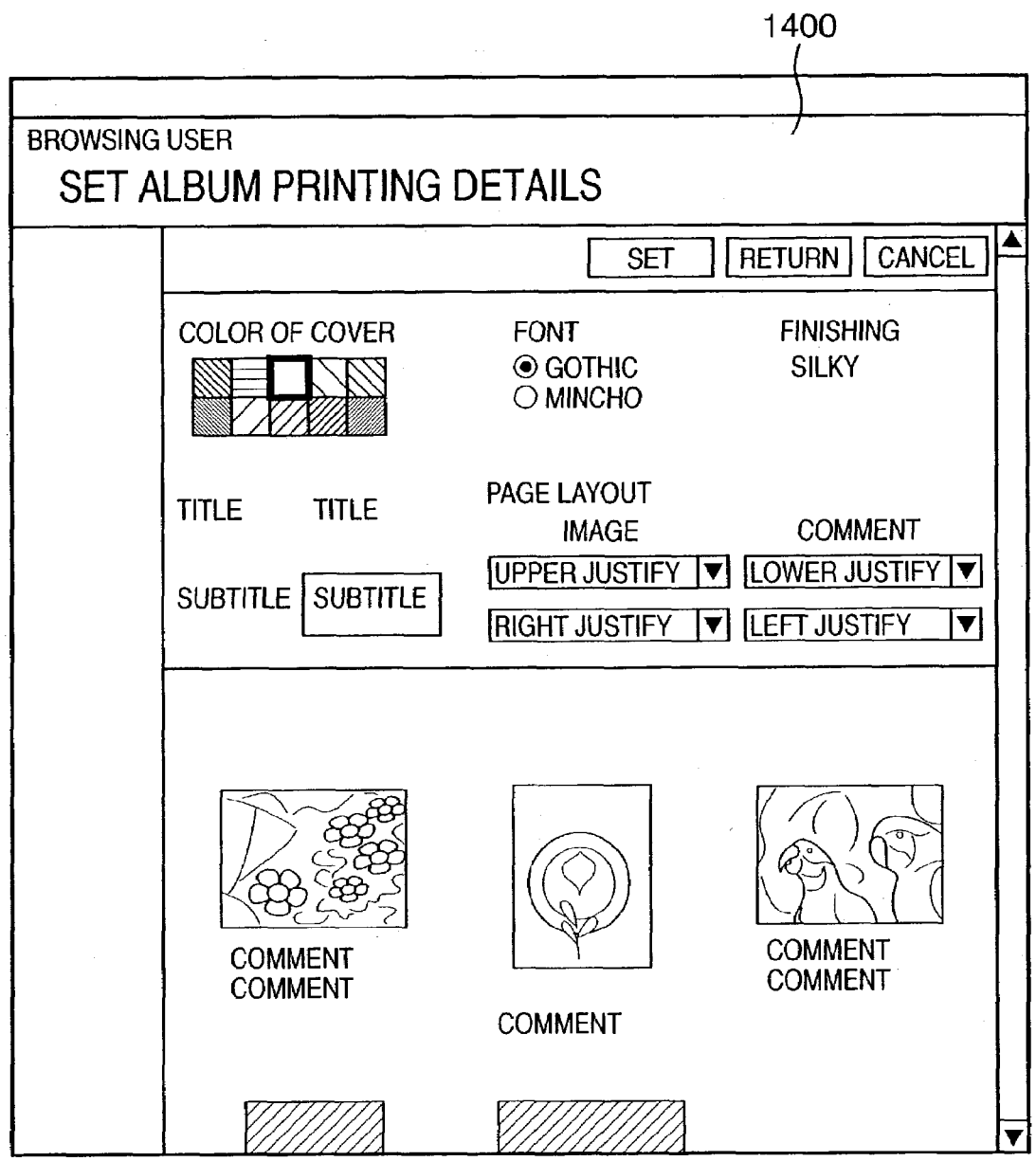
FIG. 14 is a view showing a window in which the browsing user edits album print information according to the embodiment of the present invention.

An album print confirmation window 1300 shown in FIG. 13 is an example of a window displayed in step S809 when the browsing user is allowed to edit the album print information. An "edit print information" button 1301 is displayed. When the browsing user is not allowed to edit any item of the album print information, the "edit print information" button 1301 is not displayed. An album print detail setting window 1400 shown in FIG. 14 is an example of a window displayed when the browsing user clicks on the "edit print information" button 1301 in the album print confirmation window 1300. Only items permitted to edit can be edited.

In the above embodiment, album print information management by the photo site has been described. However, the same processing as described above can be performed for management by the print site or another server.

In the above embodiment, a system that provides a print service has been described as an information providing system. However, as described in the summary of the invention, the present invention is not limited to this, and any invention that solves common problems of services using a network is incorporated in the present invention. In the embodiment, printing has been described. However, the present invention can also be applied to image display setting in browsing.

In the above embodiment, a case wherein an information providing system provides a service to archive image data and print the archived image data has been described. However, the contents to be processed by the information providing system are not limited to image data. They may be document data or audio data. The information providing system may not only print contents but also display contents on a monitor or play back contents as audio data.

The object of the present invention is achieved even by supplying a storage medium (or recording medium) which stores software program codes for implementing the functions of the above-described embodiment to a system or apparatus and causing the computer (or a CPU or MPU) of the system or apparatus to read out and execute the program codes stored in the storage medium. In this case, the program codes read out from the storage medium implement the functions of the above-described embodiment by themselves, and the storage medium which stores the program codes constitutes the present invention. The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, the storage medium stores program codes corresponding to the above-described flow charts.

As has been described above, according to the present invention, there can be provided an information processing system, an information processing apparatus, an order information use method, a storage medium which stores an information-processing-apparatus-readable program that implements the method, and a program, which make setting information related to a service, which is set by a user, usable for a third party who is to receive the service so as to provide desired setting information of the user to the third party.

Especially in a print service system, print information such as comments and layout of image data set by the user is made usable even when the third party is to print the image data, thereby providing to the third party image data printing in accordance with the user's desired layout.

As many apparently widely different embodiments of the present invention can be made without departing from the spirit and scope thereof, it is to be understood that the invention is not limited to the specific embodiments thereof except as defined in the appended claims.

What is claimed is:

1. An image management apparatus that communicates with an owner-user apparatus and a third party apparatus, comprising:

a first receiving unit that receives from the owner-user apparatus album print information indicating setting items necessary to print the plurality of images as an album;

a second receiving unit that receives from the owner-user apparatus a permitting indication of whether or not the third party apparatus is permitted to use the album print information;

a storage unit that stores the album print information in correspondence with the permitting indication;

an instruction unit that instructs a print server apparatus to print the plurality of images in accordance with the album print information, in response to an instruction received from the owner-user apparatus; and a control unit that controls whether to allow or to reject an instruction from the third party apparatus to print the plurality of images in accordance with the album print information, based on whether or not the permitting indication stored in the storage unit indicates that the third party apparatus is permitted to use the album print information, wherein said control unit comprises:

a list image transmission unit that creates list image data for displaying a plurality of images in a screen and transmits the list image data to the third party apparatus, in response to a request of browsing images received from the third party apparatus;

a judging unit that judges whether or not the permitting indication stored in the storage unit indicates that the third party apparatus is permitted to use the album print information;

an addition control unit that controls the addition of a print instruction button's image data to the list image data when the permitting indication indicates that the third party apparatus is permitted to use the album print information, but not add the print instruction button's image data to the list image data when the permitting indication does not indicate that the third party apparatus is permitted to use the album print information; and a confirmation image transmission unit that creates confirmation image data for displaying the plurality of images in a layout indicated in the album print information in the screen and transmits the confirmation image data to the third party apparatus, in response to a request of printing images received from the third party apparatus through an operation of the print instruction button.

2. The image management apparatus according to claim 1, wherein said control unit further controls to accept an instruction to individually print each of the plurality of images, when the permitting indication stored in the storage unit does not indicate that the third party apparatus is permitted to use the album print information.

3. The image management apparatus according to claim 1, wherein said control unit controls to accept the instruction to print the plurality of images in accordance with the album print information from the third party apparatus, when the permitting indication stored in the storage unit does indicate that the third party apparatus is permitted to use the album print information, and said instruction unit further instructs the print server apparatus to print the plurality of images in accordance with the album print information, in response to an instruction from the third party apparatus.

4. The image management apparatus according to claim 1, wherein said album print information includes at least one of an indication of images to be printed within the plurality of images, an order of printing the plurality, of images, an indication of an image to be printed as a cover image, a color of the cover image, a title of an album, a comment for the images to be printed, a page layout, and a font to be used.

5. The image management apparatus according to claim 1, wherein said permitting indication also includes an indication whether or not the third party apparatus is permitted to edit the album print information, and said control unit further controls to accept an editing instruction to edit the album print information for the plurality of images from the third party apparatus, when the permitting indication indicates that the third party apparatus is permitted to edit the album print information.

6. An image management method for an image management apparatus that communicates with an owner-user apparatus and a third party apparatus, comprising the steps of:

the image management apparatus receiving, from the owner-user apparatus, album print information indicating setting items necessary to print the plurality of images as an album;

the image management apparatus receiving, from the owner-user apparatus, a permitting indication of whether or not the third party apparatus is permitted to use the album print information;

storing, in a storage unit of the image management apparatus, the album print information in correspondence with the permitting indication;

the image management apparatus instructing a print server apparatus to print the plurality of images in accordance with the album print information, in response to an instruction received from the owner-user apparatus; and the image management apparatus controlling whether to allow or to reject an instruction from the third party apparatus to print the plurality of images in accordance with the album print information, based on whether or not the permitting indication stored in the storage unit indicates that the third party apparatus is permitted to use the album print information, wherein said controlling step comprises the steps of:

creating list image data for displaying a plurality of images in a screen and transmitting the list image data to the third party apparatus, in response to a request of browsing images received from the third party apparatus;

judging whether or not the permitting indication stored in the storage unit indicates that the third party apparatus is permitted to use the album print information;

controlling the addition of a print instruction button's image data to the list image data when the permitting indication indicates that the third party apparatus is permitted to use the album print information, but not add the print instruction button's image data to the list image data when the permitting indication does not indicate that the third party apparatus is permitted to use the album print information; and creating confirmation image data for displaying the plurality of images in a layout indicated in the album print information in the screen and transmitting the confirmation image data to the third party apparatus, in response to a request of printing images received from the third party apparatus through an operation of the print instruction button.

7. A computer-readable storage medium storing a computer program, which causes a computer to execute an image management method of an image management apparatus that communicates with an owner-user apparatus and a third party apparatus, said computer program comprising the steps of:

the image management apparatus receiving, from the owner-user apparatus, album print information indicating setting items necessary to print the plurality of images as an album;

the image management apparatus receiving, from the owner-user apparatus, a permitting indication of whether or not the third party apparatus is permitted to use the album print information;

storing, in a storage unit of the image management apparatus, the album print information in correspondence with the permitting indication;

the image management apparatus instructing a print server apparatus to print the plurality of images in accordance with the album print information, in response to an instruction received from the owner-user apparatus; and the image management apparatus controlling whether to allow or to reject an instruction from the third party apparatus to print the plurality of images in accordance with the album print information, based on whether or not the permitting indication stored in the storage unit indicates that the third party apparatus is permitted to use the album print information, wherein said controlling step comprises the steps of:

creating a list image data for displaying a plurality of images in a screen and transmitting the list image data to the third party apparatus, in response to a request of browsing images received from the third party apparatus;

judging whether or not the permitting indication stored in the storage unit indicates that the third party apparatus is permitted to use the album print information;

controlling the addition of a print instruction button's image data to the list image data when the permitting indication indicates that the third party apparatus is permitted to use the album print information, but not add the print instruction button's image data to the list image data when the permitting indication does not indicate that the third party apparatus is permitted to use the album print information; and creating confirmation image data for displaying the plurality of images in a layout indicated in the album print information in the screen and transmitting the confirmation image data to the third party apparatus, in response to a request of printing images received from the third party apparatus through an operation of the print instruction button.

* * * * *

UNITED STATES PATENT AND TRADEMARK OFFICE
CERTIFICATE OF CORRECTION

PATENT NO. : 7,290,031 B2 Page 1 of 1
APPLICATION NO. : 10/429769
DATED : October 30, 2007
INVENTOR(S) : Yamashita It is certified that error appears in the above-identified patent and that said Letters Patent is hereby corrected as shown below:

COLUMN 1:
      Line 33, "allow" should read -- allows --.

COLUMN 4:
      Line 15, "e" should be deleted.

COLUMN 6:
      Line 24, "The" should read -- (The --;
      Line 25, "URL" should read -- URL.) --; and
      Line 30, "brows" should read -- browse --.

COLUMN 11:
      Line 2, "A" should read -- an --.

COLUMN 14:
      Line 17, "the Plurality" should read -- a plurality --.

COLUMN 15:
      Line 16, "plurality," should read -- plurality --.

Signed and Sealed this

First Day of July, 2008

JON W. DUDAS
*Director of the United States Patent and Trademark Office*